United States Patent
McCormick

(10) Patent No.: US 6,386,322 B1
(45) Date of Patent: May 14, 2002

(54) METHOD AND APPARATUS FOR OIL WELL PUMPING

(75) Inventor: James McCormick, Greenwood, AR (US)

(73) Assignee: Baldor Electric Company, Fort Smith, AR (US)

( * ) Notice: Subject to any disclaimer, the term of this patent is extended or adjusted under 35 U.S.C. 154(b) by 0 days.

(21) Appl. No.: 09/532,923

(22) Filed: Mar. 22, 2000

(51) Int. Cl.[7] .......................... F16H 21/22; F04B 35/01; F03G 3/06
(52) U.S. Cl. .............................. 185/33; 74/41; 74/104; 212/197; 417/328
(58) Field of Search ............................. 74/41; 212/197, 212/198; 185/29, 33; 417/328, 329

(56) References Cited

U.S. PATENT DOCUMENTS

| | | | |
|---|---|---|---|
| 2,276,410 A | * | 3/1942 | Meletti ..................... 185/33 |
| 2,432,735 A | * | 12/1947 | Downing ..................... 74/110 |
| 2,915,919 A | * | 12/1959 | Mitchell et al. ............. 74/590 |
| 2,940,335 A | * | 6/1960 | Mitchell ..................... 74/589 |
| 3,209,605 A | * | 10/1965 | Scoggins, Jr. ................ 74/48 |
| 4,306,463 A | * | 12/1981 | King ......................... 74/41 |
| 4,377,092 A | | 3/1983 | Garmong ..................... 74/41 |
| 4,404,863 A | | 9/1983 | James ....................... 74/89.2 |
| 4,526,048 A | | 7/1985 | Stanton ..................... 74/53 |
| 4,729,486 A | * | 3/1988 | Petzold et al. ............. 212/302 |
| 4,907,768 A | * | 3/1990 | Masseron et al. ......... 248/123.11 |
| 4,949,784 A | * | 8/1990 | Evans ....................... 166/81.1 |
| 5,096,009 A | | 3/1992 | Hirmann ..................... 180/8.1 |
| 5,193,985 A | | 3/1993 | Escue et al. ................. 417/53 |
| 5,409,356 A | | 4/1995 | Massie ....................... 417/416 |
| 5,735,170 A | | 4/1998 | Bales et al. .................. 74/41 |

* cited by examiner

*Primary Examiner*—Allan D. Herrmann
(74) *Attorney, Agent, or Firm*—Howrey Simon Arnold & White, LLP

(57) ABSTRACT

A walking beam pumping system is disclosed wherein the pumping system's prime mover is gravity. In one embodiment, the system comprises a walking beam pivotally coupled to a support structure at a pivot point substantially central along the length of the walking beam. A counterbalance weight is disposed along the length of the walking beam. A position device is provided for moving the counterbalance weight along at least a portion of the length of the walking beam. As the counterbalance weight moves along the length of the walking beam, the beam's center of gravity is modulated. By modulating the position of the counterbalance weight in an appropriate manner, the walking beam is caused to pivot back and forth with respect to the support structure. A pumping assembly, for example a sucker rod string, is attached to one end of the walking beam, such that as the walking beam pivots back and forth, the pumping system is actuated to pump fluid out of, for example, an oil well bore. In one embodiment, the positioning device for moving the counterbalance weight comprises a linear motor.

11 Claims, 3 Drawing Sheets

METHOD AND APPARATUS FOR OIL WELL PUMPING

FIELD OF THE INVENTION

This invention relates generally to the field oil wells, and more particularly relates to a method and apparatus for pumping oil from an oil well.

BACKGROUND OF THE INVENTION

A wide array of techniques for extracting fluids, such as oil, from deep wells have been developed and practiced over the years. One well-known method for the recovery of deep well fluids, especially in the context of oil wells, utilizes a so-called "walking beam pump jack," sometimes referred to more generically as a "rod-and-beam-pump." A typical rod-and-beam pumping system has a sucker rod string attached to one end of the beam, with the beam being driven by a prime mover, usually a motor, through belts, pulleys, and a gear box system coupled to the opposite end of the beam by means of a pitman arm. The sucker rod string extends down into the well and is connected to a down-hole pump. The prime mover causes the pitman arm to provide a rocking motion of the walking beam, raising and lowering the sucker rod string. This vertical oscillation of the sucker rod string results in the lifting or sucking of fluid out of the well.

Whereas the rocking motion of a walking beam is provided by the prime mover, the resulting forces counterbalance the weight of fluid being lifted. The load on the prime mover is at a maximum when the end of the walking beam to which the sucker rod string is coupled begins its upward stroke. The load includes the weight of the sucker rod string, the weight of the fluid being lifted out of the well, and the force needed to overcome the inertia of the load following the downward stroke of the sucker rod end of the beam. At the point of maximum load on the prime mover, the constant load permits the sucker rod to reach a constant velocity until it approaches the top limit of the upward stroke. Upward movement decelerates, then ceases, followed by a subsequent downward stroke. The weight of the sucker rod string accelerates the downward movement of the walking beam until the sucker rod reaches the bottom of its down stroke, thus completing a complete pumping cycle.

The loads imposed on the prime mover of an oil well pump jack are considerable. During the upstroke of the sucker rod end of the beam, in a typical 5000 foot (1524 m) deep well, the weight of the sucker rod and the oil being lifted can reach approximately eight thousand pounds (2639 kg).

While generally popular, there are some potential disadvantages of conventional walking beam pumping systems. Conventional pumping systems are not known to be particularly efficient. Moreover, as a result of the various forces at play, severe stresses are induced into many of such systems' mechanical components, resulting in significant maintenance requirements and undesirable and costly periods of inoperability.

SUMMARY OF THE INVENTION

In view of the foregoing considerations, the present invention is directed to an improved method and apparatus for walking beam pumping. In one embodiment, an oil well pumping system is provided in which a walking beam is mounted on a beam support structure, for example, a heavy steel I-beambase or a concrete base. A sucker rod string is coupled to one end of the walking beam, and a pitman arm connects the opposite end, referred to as a drive limb in conventional walking beam pumping systems, to a rotating crank arm. Unlike conventional systems, however, the crank arm is not connected to a gearbox, but instead merely serves to limit the range of walking beam movement.

In accordance with one aspect of the invention, no mechanical force is delivered to the pumping system through the crank arm and pitman rod. Instead, the prime mover of the system is gravity, as modulated by means of a suitable counterbalance weight moveable along the length of the walking beam and carried on a low-friction bearing or the like. Moving the counterbalance weight away from the pivot point at which the walking beam is coupled to the support structure in the direction of the pitman rod increases the amount of lifting force exerted on the sucker rod string at the opposite end of the walking beam, resulting in the lifting or pumping of fluid out of the well. Conversely, moving the counterbalance weight closer to the sucker rod string end of the walking beam reduces the lifting force exerted on the sucker rod string, allowing the sucker rod string to descend back into the well in preparation for a subsequent upstroke.

Through careful dynamic modulation of the positioning of the counterbalance weight along the length of the walking beam, the beam position, motion, and sucker rod string stress can be controlled. Movement and positioning of the counterbalance weight can be accomplished by several means, including but not limited to linear electric motors, lead screws, and/or hydraulic actuators.

In accordance with another aspect of the invention, a stationary weight may be affixed on the drive limb end of the walking beam to balance the system and minimize the necessary weight of the counterbalance weight. In an optimal implementation, the counterbalance weight need only be heavy enough to displace the lifted fluid. Shifting the counterbalance weight away from the sucker rod string end of the beam increases lifting force, thereby increasing the stress placed on the sucker rod string. Determining the desired positioning of the counterbalance weight can be accomplished through analysis of its previous positioning.

In accordance with another aspect of the invention, sensors and feedback devices may be provided to determine walking beam positioning and velocity. This data, combined with the known positioning of the counterbalance weight, can be used to calculate the amount of fluid being lifted out of the well, the fluid level in the well, and even oil/water content of the fluid being extracted.

In accordance with still another aspect of the invention, certain down-hole conditions may also be maintained through automatic adjustment of the pump cycle rate. For example, the actual weight in air of the sucker rod string and all other parts of the system are known quantities. The resulting weight of the sucker rod string in fluid is computed as the weight of the sucker rod string in air minus the volume of the rod string that extends below the fluid level in the well times the density of the fluid. The total resultant weight of the rod string varies only with pump stroke and density of fluid. At some point in each pump cycle, based upon beam position, beam velocity, and counterbalance weight position, the weight and "head" of the fluid column can be determined and reported to the control system. Further, through calibration, the fluid level of the well and fluid density can be accurately determined.

When the walking beam is at the top of its stroke, a determined amount of sucker rod string is submerged in fluid. The counterbalance weight can then be moved to a position that balances the system, such that there is no movement of the walking beam. Determination of this "neutral" position for the counterbalance weight enables the weight of the sucker rod string in the fluid, since (1) the system is at rest; (2) no fluid is being lifted; and (3) there is no working fluid head. Hence, an accurate assessment of fluid density can be made. If fluid density can be accurately determined, head pressure can also be determined by measuring conditions during the up (or pump) stroke. From fluid density and head pressure values, fluid level in the well can be derived. Those of ordinary skill in the art will appreciate that all such information is important to achieve optimum output of usable fluid from a well. Pumping too fast results in either dropping the fluid level of the well or increasing the ratio of water to oil. Being able to accurately determine the down hole conditions in accordance with the principles of the present invention can significantly increase well efficiency.

BRIEF DESCRIPTION OF THE DRAWINGS

The foregoing and other features and advantages of the present invention will be further appreciated with reference to the following detailed description of specific embodiments of the invention, when read in conjunction with the accompanying drawings, wherein.

DETAILED DESCRIPTION OF SPECIFIC EMBODIMENTS OF THE INVENTION

In the disclosure that follows, in the interest of clarity, not all features of actual implementations are described. It will of course be appreciated that in the development of any such actual implementation, as in any such project, numerous engineering and related decisions must be made to achieve the developers' specific goals and subgoals (e.g., compliance with system- and business-related constraints), which will vary from one implementation to another. Moreover, attention will necessarily be paid to proper engineering practices for the environment in question. It will be appreciated that such a development effort might be complex and time-consuming, but would nevertheless be a routine undertaking for those of ordinary skill in the field of oil field technology and related technical fields having the benefit of this disclosure.

Figure 1:
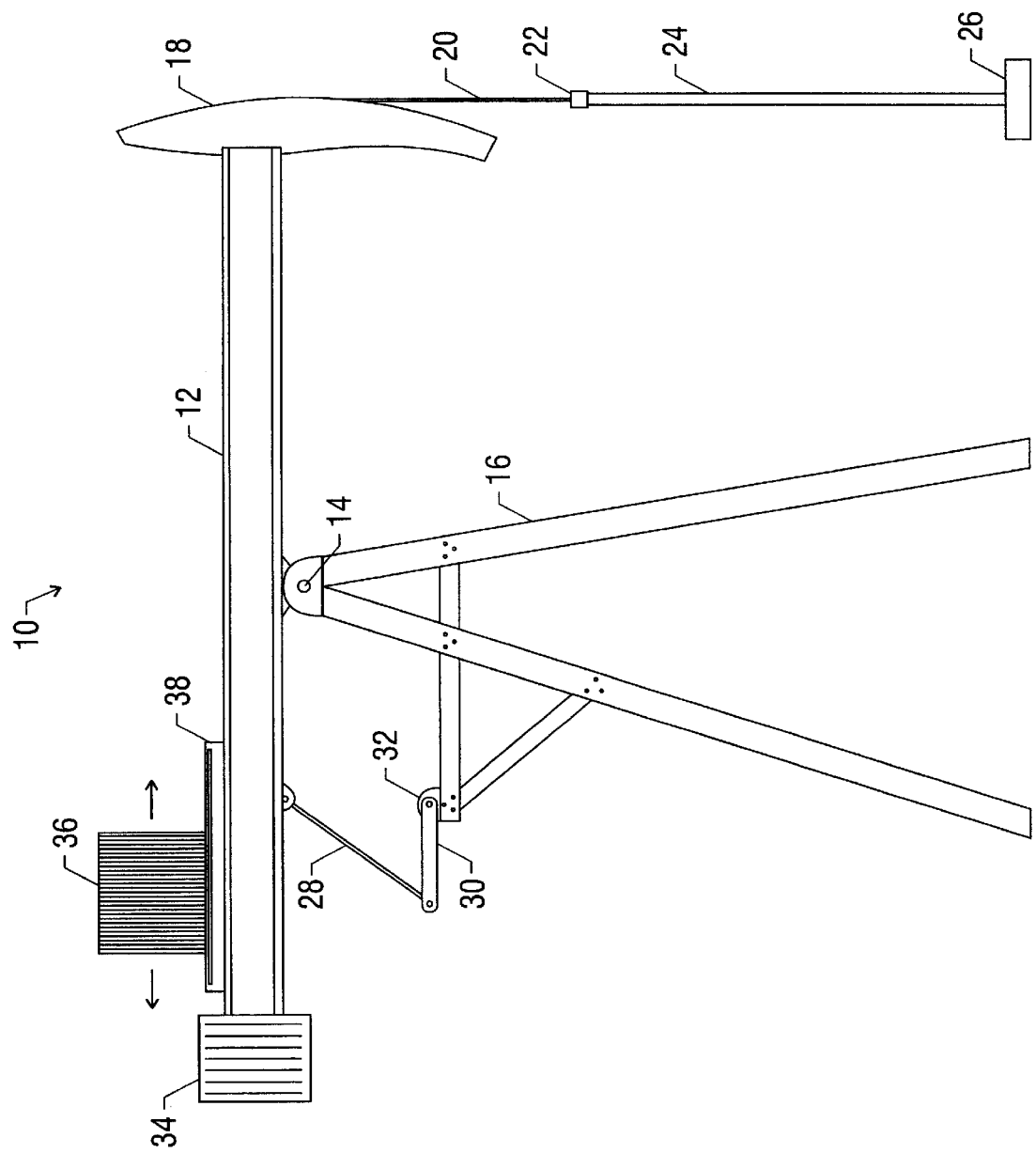
FIG. 1 is a simplified side elevational view of a walking beam pumping system in accordance with one embodiment of the invention.

Referring to FIG. 1, there is shown a schematic representation of a walking beam pumping system 10 in accordance with one embodiment of the invention. As shown in FIG. 1, system 10 incorporates a walking beam 12 pivotally mounted at a pivot point 14 to a beam support structure 16. Beam support structure may be, for example, a heavy steel I-beambase or a concrete base, in accordance with conventional practice.

With continued reference to FIG. 1, disposed on one end of walking beam 12 is a so-called "horsehead" 18, to which a hanger cable or bridle 20 is attached, in an altogether conventional configuration. Bridle 20 is attached with a polished rod 22 to a polished rod 24. The polished rod, in turn, is attached to a sucker rod string (not shown) extending down within well casing 26, again in a conventional configuration.

On the other side of pivot 14, a pitman arm 28 is pivotally coupled on one end to a crank arm 30 and on the other end to the underside of walking beam 12. Crank arm 30 is pivotally coupled to support structure 16 by means of a crank bearing 32. Depending upon the particular application, in some embodiments, a fixed position counterbalance weight 34 may be fixedly disposed on the crank arm end of walking beam 12.

In accordance with a significant aspect of the invention, pumping system 10 incorporates a movable counterbalance weight 36 disposed in the presently disclosed embodiment substantially on top of walking beam 12. Counterbalance weight 36 is capable of linear movement along at least some portion of the length of walking beam 12. As would be appreciated by those of ordinary skill in the art, as counterbalance weight 36 moves along walking beam 12, the center of gravity of the overall pumping system, including walking beam 12, stationary counterbalance weight 34, horsehead 18, and the sucker rod string, is correspondingly moved.

Associated with counterbalance weight 36 is a positioning device 38 for enabling the position of counterbalance weight to be controlled. In one embodiment, positioning device 38 comprises a linear bearing assembly in conjunction with conventional linear electric motor technology. Linear motors are well known and available from numerous commercial entities. Linear motors suitable for the purposes of practicing the present invention are available, for example, from Northern Magnetics, Inc., Santa Clarita, Calif.

Alternative positioning devices are also contemplated. For example, positioning device 38 may comprise a linear bearing assembly in conjunction with worm-screw drive technology or with conventional hydraulic technology.

Regardless of the particular nature of the positioning device 38, it is contemplated in accordance with the presently disclosed embodiments that positioning device 38 provide a sufficient range of linear movement of counterbalance weight 36 to modulate the center of gravity of the walking beam when it is loaded with a sucker string during a pumping operation, as will hereinafter be described in further detail. Moving counterbalancing weight 36 away from beam pivot 14 increases the amount of upward force on the sucker rod string, resulting in fluid being pumped out of the well. Moving counterbalance weight 36 closer to beam pivot 14 reduces the lifting force on the sucker string, allowing it to descend back into the well. Stationary counterbalance weight 34 may be provided to minimize the amount of counterbalance weight that has to be moved by the positioning device 38. In one embodiment, stationary counterbalance weight 34 is sized to counterbalance substantially the entire weight of the sucker rod string, such that movable counterbalance weight 36 need only be heavy enough to counterbalance the weight of fluid being lifted.

Operation of pumping system 10 will be readily understood by those of ordinary skill in the art. By controlling the distance between the center of gravity of counterbalance weight 36 and beam pivot 14, the amount of lifting force exerted on the sucker rod string is controlled. Controlling the lifting force, in turn, controls stress on the sucker rod string, and further can control the velocity of walking beam travel.

One or more sensors are associated with walking beam 12. In one embodiment, at least one motion sensor, i.e., an accelerometer or the like, is disposed in one or more strategic locations along the length of walking beam 12 in order that the position and/or speed of travel of walking beam 12 can be determined.

Figure 2:
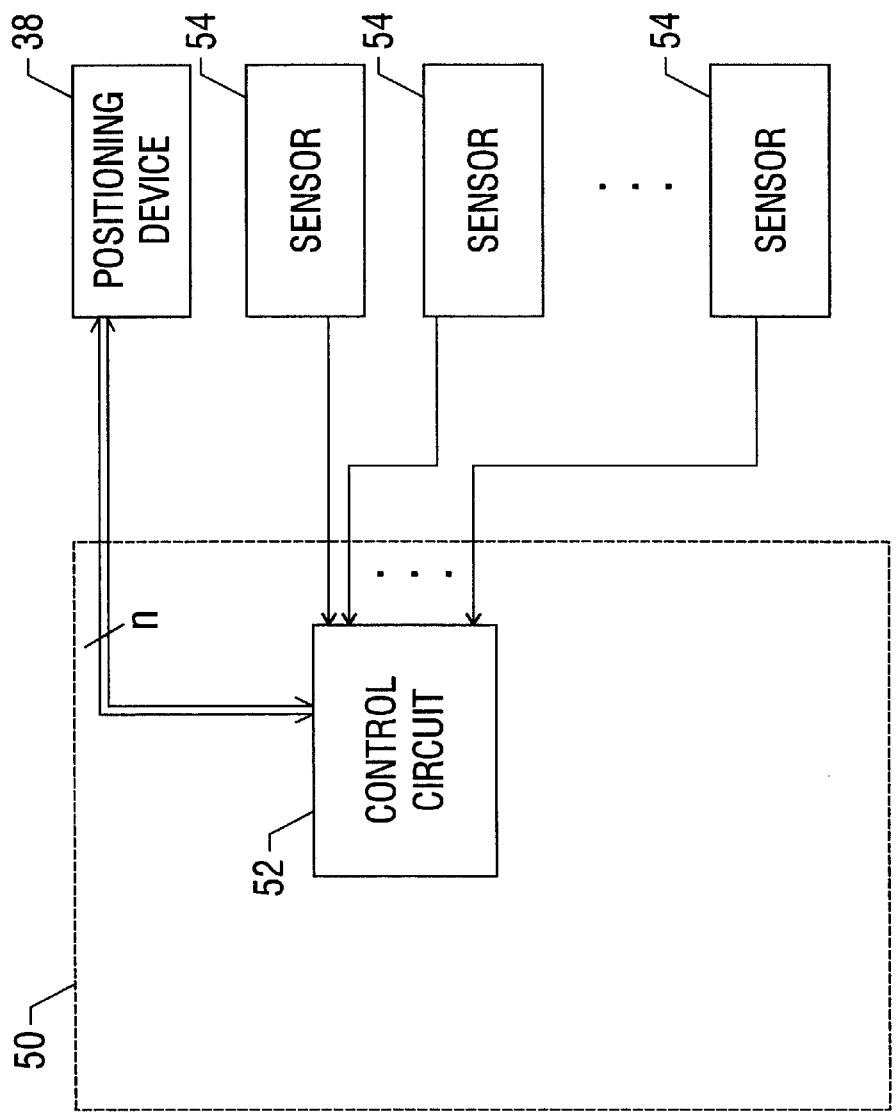
FIG. 2 is a block diagram of a control subsystem for the pumping system of FIG. 1.

Turning to FIG. 2, there is shown a block diagram of an operational control subsystem 50 in accordance with one embodiment of the invention. As shown in FIG. 2, control subsystem 50 comprises an electronic control circuit 52. In the presently disclosed embodiment, control circuit 52 may comprise a microprocessor-based computer platform, or, alternatively, may comprise dedicated hardwired circuitry implementing, for example, a finite operational state machine. It is contemplated that control circuit 52 may be disposed on or in close proximity to the components of pumping system 10 shown in FIG. 1. Alternatively, control circuit 52 may be disposed at a remote location. Indeed, it is contemplated for implementations involving multiple pumping systems 10 disposed at geographically distributed locations, it is possible for the respective control subsystems 50 to be located at some central station.

With continued reference to FIG. 2, control circuit 52 is coupled to positioning device 38 in order that control circuit 52 can communicate appropriate electrical control signals to positioning device 38 to control the position of counterbalance weight 36, and in order that positioning device 38 or sensors associated therewith may communicate information about the position and status of positioning device 38 to control circuit 52. That is to say, communication of electronic signals between control circuit 52 and positioning device 38 is preferably bidirectional.

Control circuit 52 is likewise in electrical communication with one or more sensors 54 disposed on or about pumping system 10. It is contemplated that numerous different types of sensors 54 may be advantageously employed in the disclosed pumping system. As noted above, one type of sensor 54 may be an accelerometer or the like for monitoring the movement of walking beam 12. Other types of sensors 54 may be provided, for example, sensors 54 for monitoring and reporting to control circuitry 52 the current positions of walking beam 12 and counterbalance weight 36. Still further sensors 54 may be provided to measure the forces exerted on walking beam 12 by the sucker rod string. It is contemplated that those of ordinary skill in the art having the benefit of the present disclosure will readily appreciate many other different types of sensors which might be advantageously provided for monitoring and reporting on various operational parameters of pumping system 10.

In the embodiment of FIG. 2, it is assumed that control subsystem 50 is disposed in close proximity to the remaining components of pumping system 10, such that the various electrical connections between control circuit 52, positioning device 38, and sensors 54 may be implemented as simple hard-wired connections. As noted above, however, it is contemplated that in some implementations it may be necessary or advantageous to locate control subsystem 50 remotely from the remaining components of the system 10. A simple example of such an implementation is depicted in the block diagram of FIG. 3.

Figure 3:
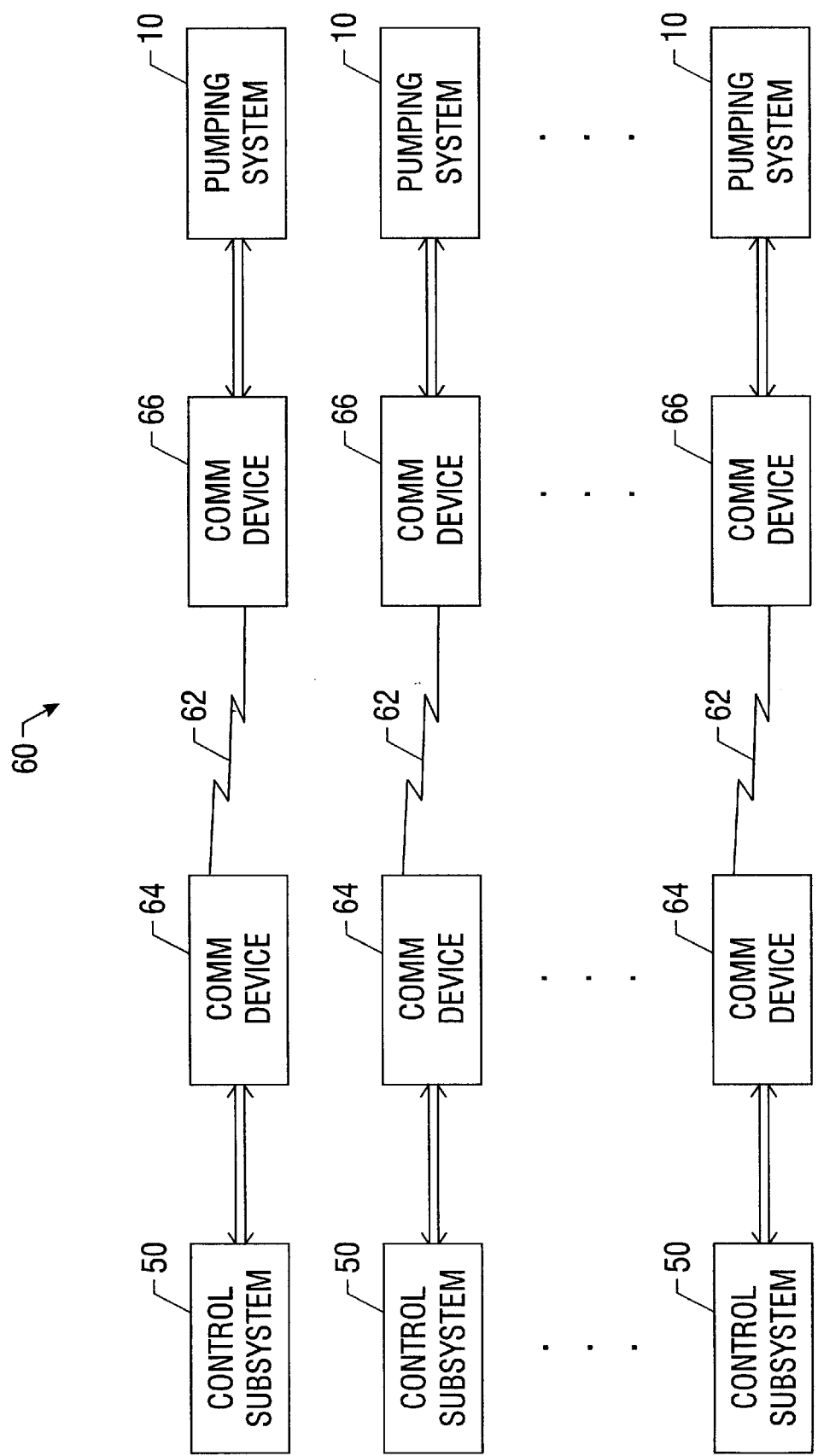
FIG. 3 is a block diagram of a distributed pumping system comprising a plurality of walking beam pumping systems in accordance with that from FIG. 1.

Referring to FIG. 3, there is shown a pumping system 60 comprising a plurality of pumping systems 10 essentially identical to that depicted in greater detail in FIG. 1. In addition, system 60 comprises a corresponding plurality of control subsystems 50, with each control subsystem 50 assumed to be located at sites geographically separated from the respective pumping systems 10 they control.

In order that electrical signals can be communicated between remotely-located control subsystems 50 and the respective pumping systems 10, a communications link 62 must be established between each control subsystem 50 and the pumping system 10 it controls. To this end, a plurality of control-side communications devices 64 and a plurality of pumping-side communications devices 66 are provided. As used herein, the term "communications device" is intended to be interpreted broadly to include any type of transmit/receive apparatus suitable for communicating real-time or near-real-time information between two separated locations. Various implementations of communications devices are believed to be suitable for the purposes of practicing the present invention. Communications links may take the form of transmitted radio signals, cellular telephone signals, or satellite signals, to mention but a few possible examples. It is contemplated that those of ordinary skill in the art having the benefit of the present disclosure would be able to readily implement communications devices suitable for the purposes of establishing the necessary communications links 62. Particular details about the possible implementations of communications devices 64 and 66 are not believed to be of any particular consequence to the present invention and will hence not be discussed in considerable detail herein.

In FIG. 3, a separate control subsystem 50 is provided for each pumping system 10 in the system 60. As noted above, control subsystem 50 may be implemented in numerous ways, including that of a microprocessor-based computer subsystem. Thus, depending upon the processing capabilities of a given control subsystem 50, it may be possible that the control subsystem may be able to communicate with and control the operation of more than one pumping system 10 at a time. Likewise, although separate communications devices 64 are shown for each control subsystem 50 in FIG. 3, a communications device with appropriate multiplexing capabilities may be able to support communications functions for more than one control subsystem 50.

From the foregoing detailed description of specific embodiments of the invention, it should be apparent that a method and apparatus for walking-beam oil well pumping has been disclosed wherein the prime mover is gravity, and wherein control of the pumping action of the walking beam is accomplished through the use of a moveable counterbalancing weight disposed thereon. Although specific implementations of the present invention have been described herein in some detail, this has been done solely for the purposes of illustrating various aspects of the invention and is not intended to be limiting with respect to the scope of the invention as defined in the claims. It is contemplated that numerous substitutions, alterations and/or modifications may be made to the disclosed embodiments, including but not limited to those implementation alternatives which may have been specifically noted herein, without departing from the spirit and scope of the invention.

What is claimed is:

1. A pumping system for pumping fluid, comprising:
   a walking beam support structure;
   a walking beam, pivotally coupled to said walking beam support structure at a pivot point substantially central along the length of said walking beam, said walking beam having a first end adapted to engage a sucker rod string extending upwardly from a well bore;
   a counterbalancing weight assembly, comprising a counterbalancing weight movably along at least a portion of the length of said walking beam and a positioning device coupled to said counterbalancing weight for changing the position of said counterbalancing weight along the length of said walking beam
   such that movement of said counterbalancing weight along the length of said walking beam changes the center of gravity of said walking beam with respect to said pivot point, thereby actuating said pumping system.

2. A pumping system in accordance with claim 1, further comprising:
   a stationary counterbalancing weight disposed substantially near a second end of said walking beam opposite said first end.

3. A pumping system in accordance with claim 1, further comprising:
   a control subsystem for generating control signals applied to said positioning device, said positioning device being responsive to said control signals to move said counterbalancing weight to a specified position along the length of said walking beam.

4. A pumping system in accordance with claim 3, further comprising at least one sensor, coupled to said control subsystem, for generating at least one electrical signal reflecting the status of at least one operational parameter of said pumping system.

5. A pumping system in accordance with claim 3, wherein said control subsystem comprises a microprocessor-based computer platform.

6. A pumping system in accordance with claim 1, wherein said positioning device comprises a linear motor.

7. A pumping system in accordance with claim 1, wherein said positioning device comprises a worm-screw.

8. A method of pumping fluid, comprising:
   (a) pivotally coupling a walking beam to a walking beam support structure at a pivot point substantially central along the length of said walking beam;
   (b) coupling a pumping apparatus to one end of said walking beam;
   (c) disposing a counterweight balance at a point along the length of said walking beam;
   (d) moving said counterweight balance along at least a portion of the length of said walking beam so as to change the location of the center of gravity of said walking beam with respect to said pivot point;
   wherein said change in the location of the center of gravity of said walking beam is such that said walking beam is caused to pivot at said pivot point, thereby actuating said pumping apparatus.

9. A pumping system in accordance with claim 1, wherein said fluid is oil.

10. A method of pumping fluid, comprising:
    (a) pivotally coupling a walking beam to a walking beam support structure at a pivot point substantially central along the length of said walking beam;
    (b) coupling a pumping apparatus to one end of said walking beam;
    (c) disposing a counterweight balance at a point along the length of said walking beam;
    (d) moving said counterweight balance along at least a portion of the length of said walking so as to change the location of the center of gravity of said walking beam with respect to said pivot point;
    wherein said change in the location of the center of gravity of said walking beam is such that said walking beam is caused to pivot at said pivot point, thereby actuating said pumping apparatus.

11. A method in accordance with claim 10, wherein said step of moving said counterweight balance comprises applying control signals to a positioning device coupled to said counterweight balance.

* * * * *